(12) United States Patent
Bie et al.

(10) Patent No.: US 9,430,668 B2
(45) Date of Patent: Aug. 30, 2016

(54) SEAMLESS UPGRADE FOR NETWORK SYSTEM

(71) Applicant: Microsoft Technology Licensing, LLC, Redmond, WA (US)

(72) Inventors: Fuyuan Bie, Bothell, WA (US); Le Chang, Sammamish, WA (US); Balinder Malhi, Redmond, WA (US); Sundar Paranthaman, Sammamish, WA (US); Randy Thomson, Redmond, WA (US); Kalyan Kona, Sammamish, WA (US); Zohar Raz, Redmond, WA (US); Darius Snapkauskas, Sammamish, WA (US); Atanu Banerjee, Seattle, WA (US); Roshane Silva, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/292,802

(22) Filed: May 30, 2014

(65) Prior Publication Data

US 2015/0347775 A1 Dec. 3, 2015

(51) Int. Cl.
*G06F 17/30* (2006.01)
*G06F 21/62* (2013.01)
*H04L 29/08* (2006.01)

(52) U.S. Cl.
CPC ........... *G06F 21/6218* (2013.01); *G06F 21/62* (2013.01); *H04L 67/10* (2013.01)

(58) Field of Classification Search
CPC combination set(s) only.
See application file for complete search history.

(56) References Cited

U.S. PATENT DOCUMENTS

| | | | |
|---|---|---|---|
| 6,915,302 B1 * | 7/2005 | Christofferson | .. G06F 17/30097 |
| 7,380,003 B1 | 5/2008 | Guo et al. | |
| 7,630,877 B2 | 12/2009 | Brown et al. | |
| 7,757,226 B2 | 7/2010 | Srivastava et al. | |
| 8,326,800 B2 | 12/2012 | Cunningham et al. | |
| 8,417,737 B2 | 4/2013 | Hopmann et al. | |
| 8,479,056 B2 | 7/2013 | Andrews et al. | |
| 8,549,144 B2 | 10/2013 | Khangaonkar et al. | |
| 8,606,752 B1 | 12/2013 | Beatty et al. | |
| 2004/0148251 A1 * | 7/2004 | Kavoun | ................. G06Q 20/02 705/39 |
| 2005/0278392 A1 * | 12/2005 | Hansen | ............. G06F 17/30581 |
| 2006/0069836 A1 * | 3/2006 | Seo | ........................... G06F 8/65 710/302 |
| 2006/0112170 A1 * | 5/2006 | Sirkin | ............... H04L 29/12066 709/217 |
| 2007/0289027 A1 * | 12/2007 | Johnson | ................. G06Q 30/06 726/29 |
| 2009/0282266 A1 * | 11/2009 | Fries | ..................... G06F 21/602 713/193 |

OTHER PUBLICATIONS

"The Apache HBase™ Reference Guide", Retrieved at: <<http://hbase.apache.org/book.html#hbase.binary.compatibility>>, Jan. 21, 2011, 145 pages.
"Performing a Rolling Update of a Scalable Shared Database", Retrieved at: <<http://technet.microsoft.com/en-us/library/ms345381(v=sql.105).aspx>>, Aug. 18, 2012, 4 pages.
(Continued)

*Primary Examiner* — Etienne Leroux
(74) *Attorney, Agent, or Firm* — Julie Kane Akhter; Tom Wong; Micky Minhas (57) ABSTRACT

In one embodiment, a network system may be upgraded without losing access to write privileges to a network file 122 during the system upgrade. A network file management system 120 may execute a system upgrade. A network file management system 120 may provide direct write access for a data file 122 to a user throughout the system upgrade.

19 Claims, 8 Drawing Sheets

(56) References Cited

OTHER PUBLICATIONS

"Administering ASM Instances", Retrieved at: <<http://docs.oracle.com/cd/B28359_01/server.111/b31107/asminst.htm#OSTMG136>>, Nov. 24, 2011, 22 pages.

"Overview of the upgrade process to SharePoint 2013", Retrieved at: <<http://technet.microsoft.com/en-us/library/cc262483(v=office.15>>, Jul. 16, 2012, 8 pages.

"Content Matrix", Retrieved at: <<http://www.metalogix.com/Products/Content-Matrix.aspx>>, Jan. 15, 2013, 3 pages.

"Quest Migration Manager 8.10, Installation Guide", Retrieved at: <<ftp://cpe-107-015-012-234.nc.res.rr.com/AiDisk_a1/Phone_Bak/Downloads/MigrationManager_8.10_InstallGuide.pdf >>, 2013, 34 pages.

Mittal, Harsh., "Introduction to Web Deploy", Retrieved at: <<http://www.iis.net/learn/publish/using-web-deploy/introduction-to-web-deploy>>, Dec. 9, 2011, 4 pages.

"Content Matrix 6.0 Helps IT Upgrade, Migrate, and Organize SharePoint Content", Retrieved at: <<http://esj.com/articles/2012/11/07/content-matrix-6.aspx>>, Jul. 11, 2012, 2 pages.

* cited by examiner

SEAMLESS UPGRADE FOR NETWORK SYSTEM

BACKGROUND

A network file management system may store a data file accessible by multiple users via a data network. The data file may be a multi-share data file, accessible to be edited by multiple users. The network file management system may track any changes made to the data file by a user. Further, the network file management system may perform any conflict resolution to alleviate conflicting edits performed by multiple users.

To upgrade a network system, the network system may be transferred from a source server space to a target server space. During this system upgrade, the user may be blocked from making any changes to any data stored on the network system to prevent having to add file changes to the target server space. A user may be alerted to the specific downtime window during the system upgrade so that the user may plan accordingly.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to upgrading a network system without losing access to write privileges to a network file during the system upgrade. A network file management system may execute a system upgrade. A network file management system may provide direct write access for a data file to a user throughout the system upgrade.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a network file management system.

During a system upgrade, a user may be prevented from editing a document or web page stored on a network file management system. The user may not execute a write operation during the time window of the system upgrade. While the maintenance window may be shortened and scheduled, the user may be still be inconvenienced.

To allow consistent access to any stored data files, the network file management system may control the flow of access requests using network frontend clusters running on different version of binaries by directing the user requests to the same content database acting as backend storage. The network file management system may direct the access requests to a user proxy account operating with whichever configuration is appropriate. The network file management system may use management proxy accounts to restrict write access to the content database when shared among multiple frontend clusters.

The source frontend for the network file management system may receive an access request from a client device. A load balancer of the network file management system may direct the access request to a source user proxy account. The network file management system may direct an access request from the source server farm of the network file management system to a source management proxy account. The content database may be connected to the source server farm, with both source user proxy account and the source management proxy account having access. A grid manager of the network file management system may remove write access from the source management proxy account, which eliminate changes from background access requests.

The network file management system may grant any target user proxy account and target management proxy accounts full access to the content database. The source server farm and the target server farm may share access to the content database. The load balancer may redirect any access requests from the client device to a target user proxy account executing on a virtual machine operated by the target server farm, seamlessly granting access. Once the content database is connected to the target server farm, access requests initiated from the target server farm assume control of background operations. The grid manager may disconnect the source server farm from the content database to finish the system upgrade.

Thus, in one embodiment, a network system may be upgraded without losing access to write privileges to a network file during the system upgrade. A network file management system may maintain a content database separate from a source server farm configuration database that stores source configuration data. A network file management system may execute a system upgrade from the source server farm configuration database to a target server farm configuration database that stores target configuration data. A network file management system may process an access request to a data file on the content database during the system upgrade.

Figure 1:
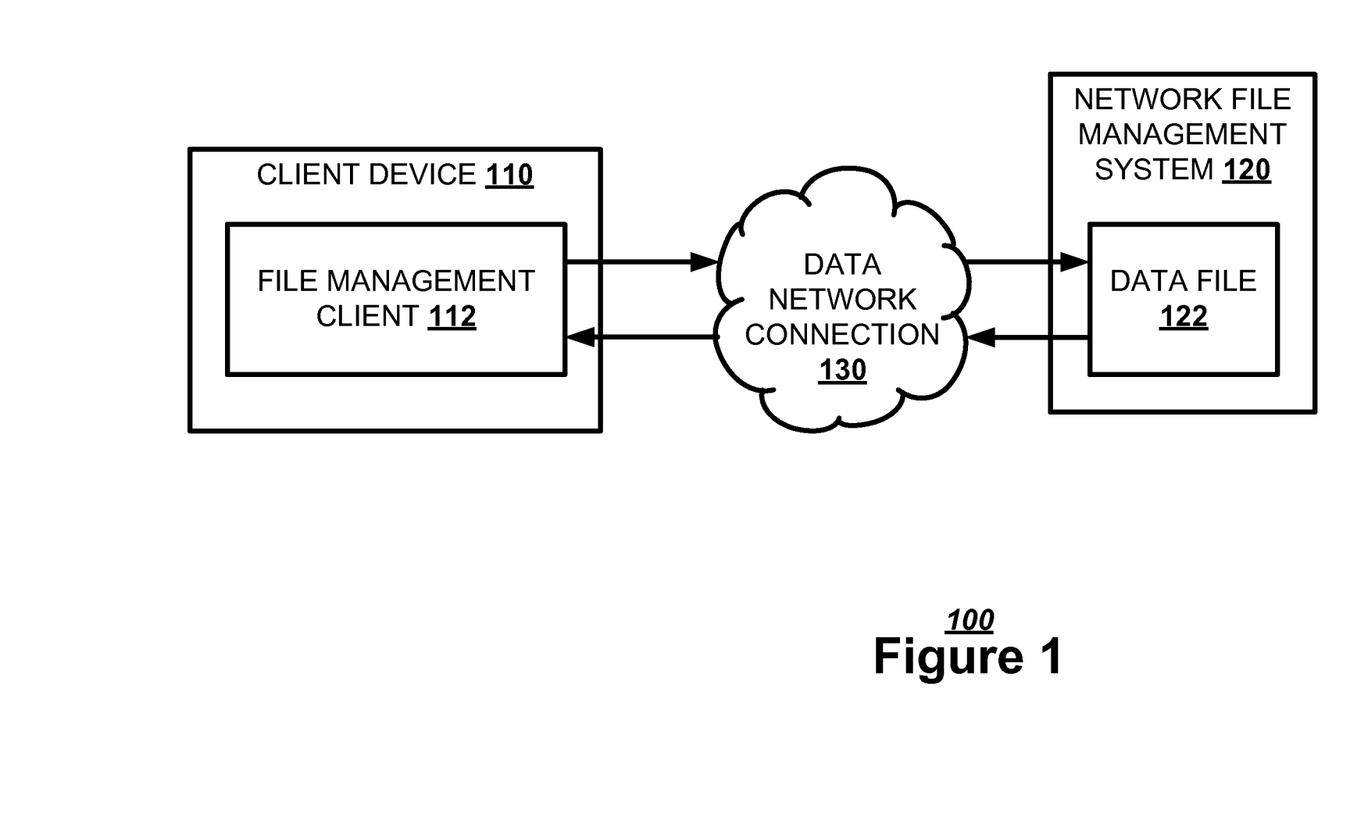
FIG. 1 illustrates, in a block diagram, one embodiment of a data network.

FIG. 1 illustrates, in a block diagram, one embodiment of a data network 100. A client device 110 may execute a network file management client 112 to connect to a network file management system 120 via a data network connection 130. The network file management client may be a separate application or integrated into an operating system or an internet browser platform. The network file management system 120 may refer to a single server or a distributed set of servers that may access the cloud data set, such as a server farm. The data network connection 130 may be an internet connection, a wide area network connection, a local area network connection, or other type of data network connections. The network file management client 112 may access a data file 122 stored in the network file management system 120.

The network file management client 112 may allow a user to perform a read operation or a write operation on the data file 122 over a network. A read operation sends a copy of the data stored in the data file 122 to the client device 110. A write operation creates or deletes a data file 122 or enters changes to the data file 122 as stored in the network file management system 120.

Figure 2:
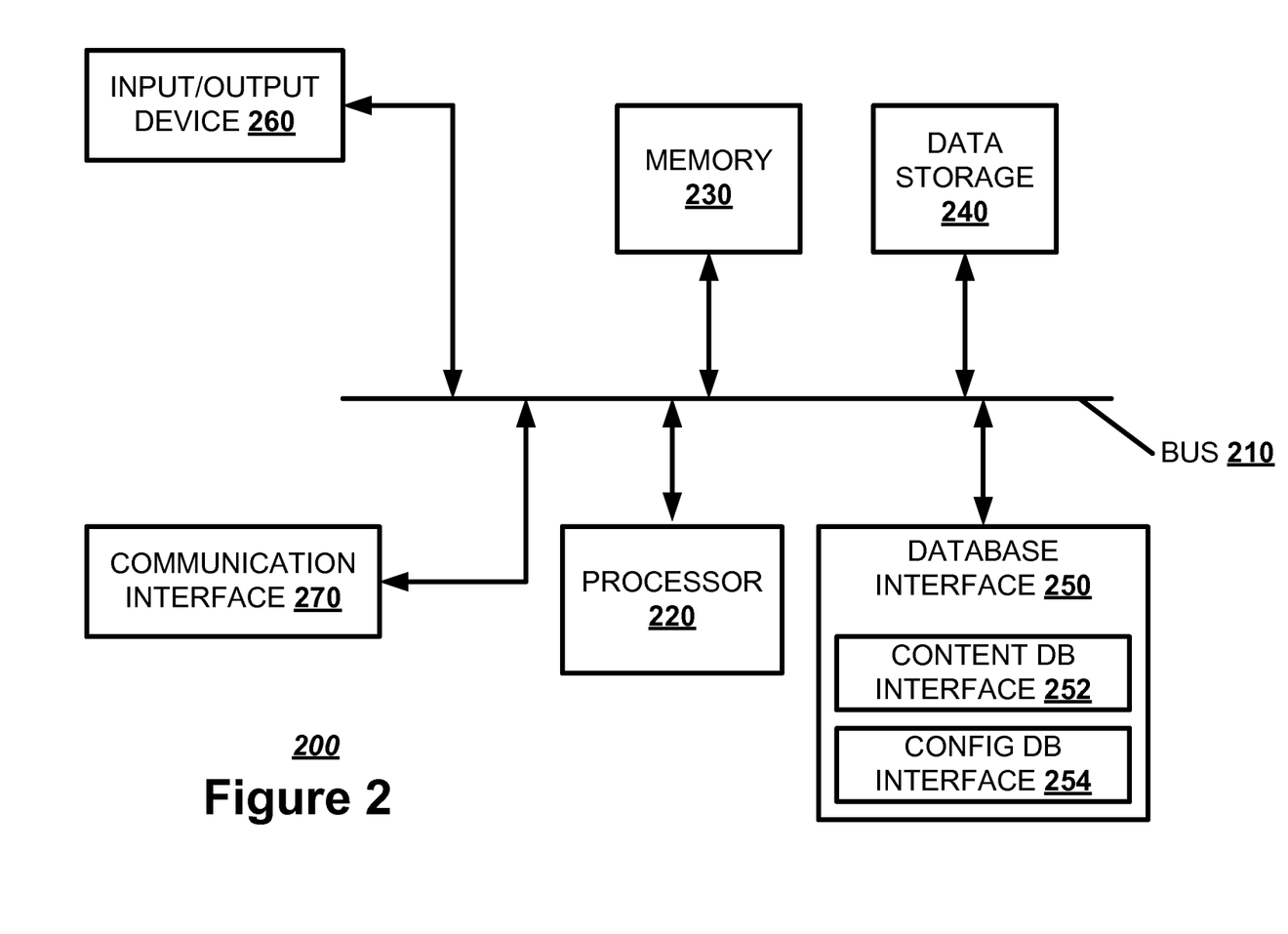
FIG. 2 illustrates, in a block diagram, one embodiment of a computing device.

FIG. 2 illustrates a block diagram of an exemplary computing device 200 which may act as a client device 110 or a server implementing a network file management system 120. The computing device 200 may combine one or more of hardware, software, firmware, and system-on-a-chip technology to implement a client device 110 or a server implementing a network file management system 120. The computing device 200 may include a bus 210, a processor 220, a memory 230, a data storage 240, a database interface 270, an input/output device 260, and a communication interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to an ephemeral medium such as a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method.

The database interface 250 may connect to a database storing content, such as a data file, or a database storing configuration data for the network file management system 120. The computing device 200 may have a content database interface 252 to interact with a content database and a server farm configuration database interface 254 to interact with a server farm configuration database. The computing device 200 may have a database interface 250 act as both a content database interface 252 and a server farm configuration database interface 254.

The input/output device 260 may include one or more conventional mechanisms that permit a user to input information to the computing device 200, such as a keyboard, a mouse, a voice recognition device, a microphone, a headset, a gesture recognition device, a touch screen, etc. The input/output device 260 may include one or more conventional mechanisms that output information to the user, including a display, a printer, one or more speakers, a headset, or a medium, such as a memory, or a magnetic or optical disk and a corresponding disk drive. The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may act as a database interface 250.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240 or via the database interface 250, or from a separate device via the communication interface 270.

Figure 3:
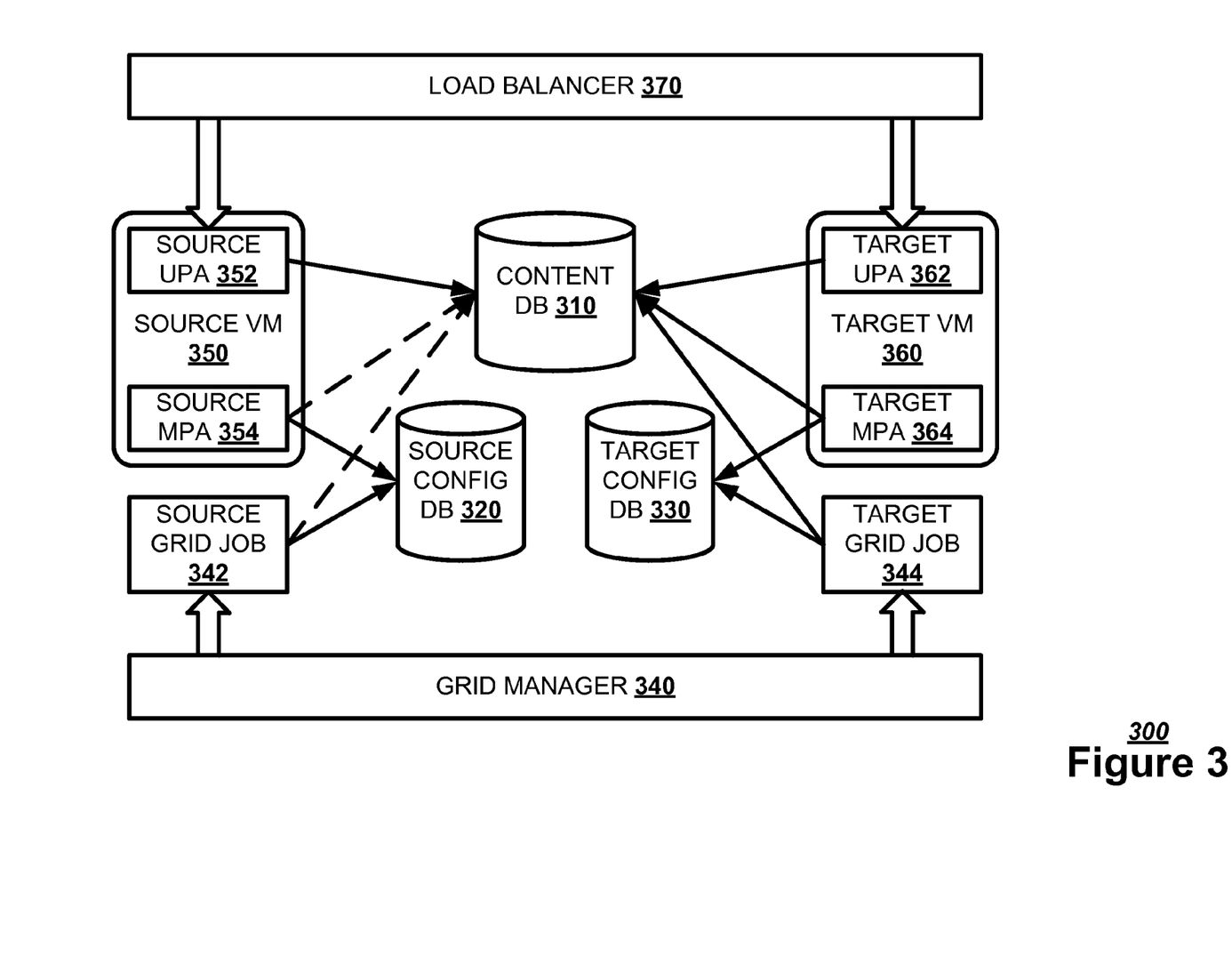
FIG. 3 illustrates, in a block diagram, one embodiment of a system architecture for a network file management system.

FIG. 3 illustrates, in a block diagram, one embodiment of a system architecture 300 for a network file management system 120. The network file management system 120 may maintain a content database 310 to store one or more data files 122. The network file management system 120 may maintain the content database 310 separate from a server farm configuration database. The server farm configuration database may store configuration data used by a server farm to process, store, present, and manage the data files 122 stored in the content database 310, such as administrative data, formatting data, mapping data, and other data. By keeping the server farm configuration database separate from the content database 310, the server farm configuration database may be updated or changed without affecting the content database 310.

In a system upgrade, a source server farm configuration database 320 may store source configuration data manage the data files 122 in the content database 310. The network file management system 120 may have a target server farm configuration database 330 containing the source configuration data with updates and patches applied to create target configuration data. The network file management system 120 may dual-mount the content database 310 to the source server farm configuration database 320 and the target server farm configuration database 330. The network file management system 120 may have a source server farm configuration database interface 254 to interact with a source server farm configuration database 320 or a target server farm configuration database interface 254 to interact with a target server farm configuration database 330. Alternately, the network file management system 120 may have a server farm configuration database interface 254 to act as both a source server farm configuration database interface 254 and a target server farm configuration database interface 254.

The network file management system 120 may have a grid manager 340. The grid manager 340 may implement various grid jobs and internal administration jobs. The grid manager 340 may administer a set of source grid jobs 342 from the source server farm. The grid manager 340 may administer a set of target grid jobs 344 from the target server farm.

A processor 220 of the network file management system 120 may execute a virtual machine (VM) to operate a proxy account to handle access requests to the content database 310 using configuration data from the server farm configuration database. The virtual machine may use a user proxy account (UPA) to handle access requests from the client device 110, such as read operations, write operations, worker processes, and web service application pool operations. The virtual machine may use a management proxy account (MPA) to handle access requests from a server farm, such as read operations, write operations, farm operations, and timer operations.

A source virtual machine 350 may use source configuration data to access the content database 310. The source virtual machine 350 may operate a source user proxy account 352 to handle access requests from a client device 110 and a source management proxy account 354 to handle access requests from the source server farm. A target virtual machine 360 may use target configuration data to access the content database 310. The target virtual machine 360 may operate a target user proxy account 362 to handle access requests from a client device 110 and a target management proxy account 364 to handle access requests from the target server farm.

During the system upgrade, a load balancer 370 may receive access requests from the client device 110. Prior to a changeover point, the load balancer 370 may direct an access request to a source user proxy account 352 in the source virtual machine 350 to process, allowing the client device 110 to execute a read operation or a write operation on the data file 122. A changeover point occurs when the network file management system 120 removes a write access to the data files 122 from the source management proxy account 354 and the source grid jobs 342. After the changeover point, the load balancer 370 redirects the access requests to a target user proxy account 362 in the target virtual machine 360 to process. Once the system upgrade is complete, the source server farm configuration database 320 may be dis-mounted from the content database 310.

Figure 4:
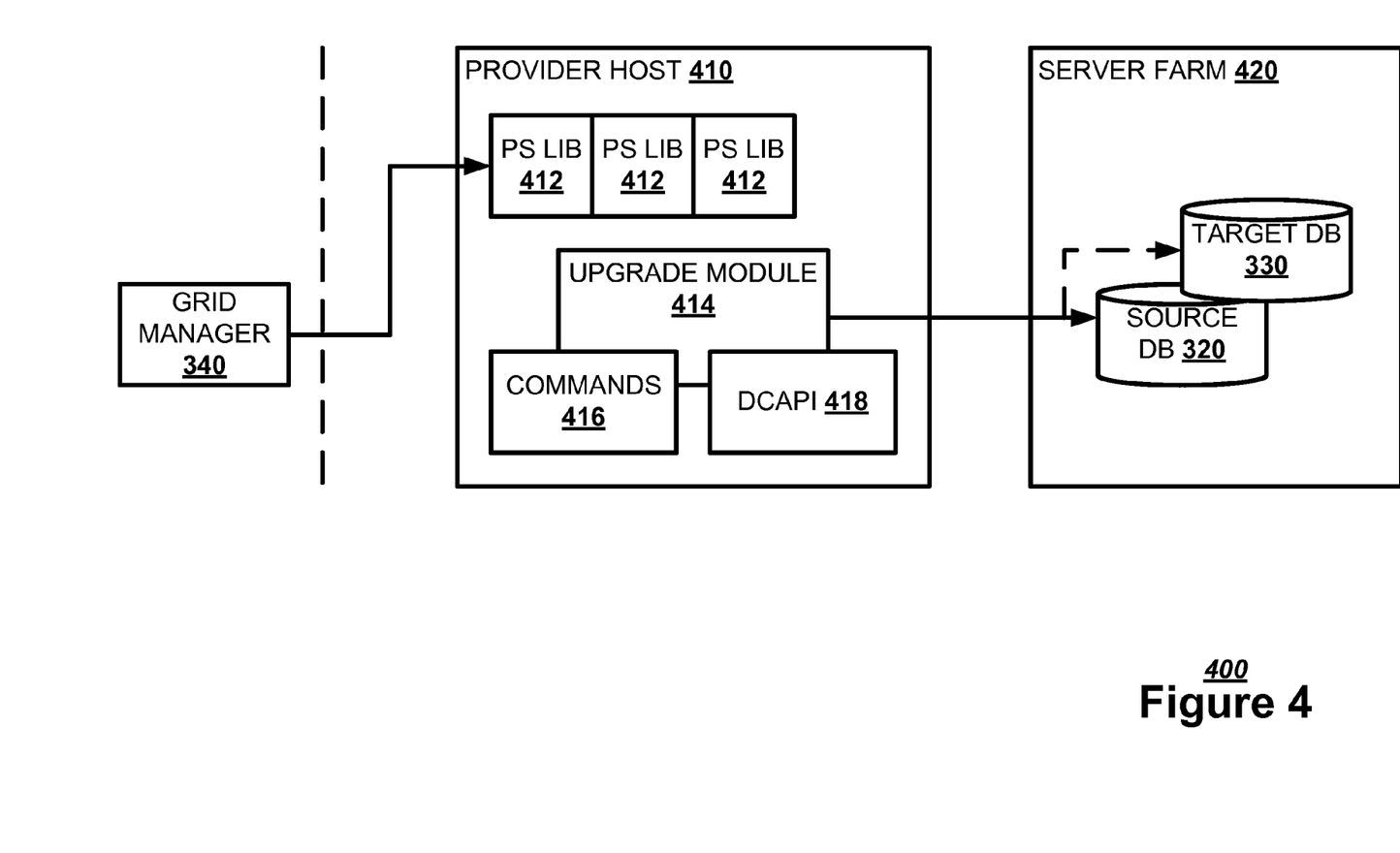
FIG. 4 illustrates, in a block diagram, one embodiment of a system upgrade software architecture.

The network file management system 120 may use one or more different software architectures to implement the system upgrade. For example, FIG. 4 illustrates, in a block diagram, one embodiment of a system upgrade software architecture 400. The grid manager 340 may establish a remote session with a provider host 410 executing on one of the virtual machines. A provider host 410 loads a provider into a shared host process that has a specified level of privilege. The provider host 410 may have a post script library (PS LIB) 412 to ensure that an upgrade module 414 is loaded. The post script library 412 may retrieve practical data, such as grid objects, for use by the upgrade module 414. The upgrade module 414 may handle the permission switching, mounting, and dismounting of the databases using lightweight commands 416 and a data capture application programming interface (DCAPI) 418 to update data. The upgrade module 414 may establish a structured query language connection with a server farm 420 to mount and dismount the source server farm configuration database 320 and the target server farm configuration database 330.

Figure 5:
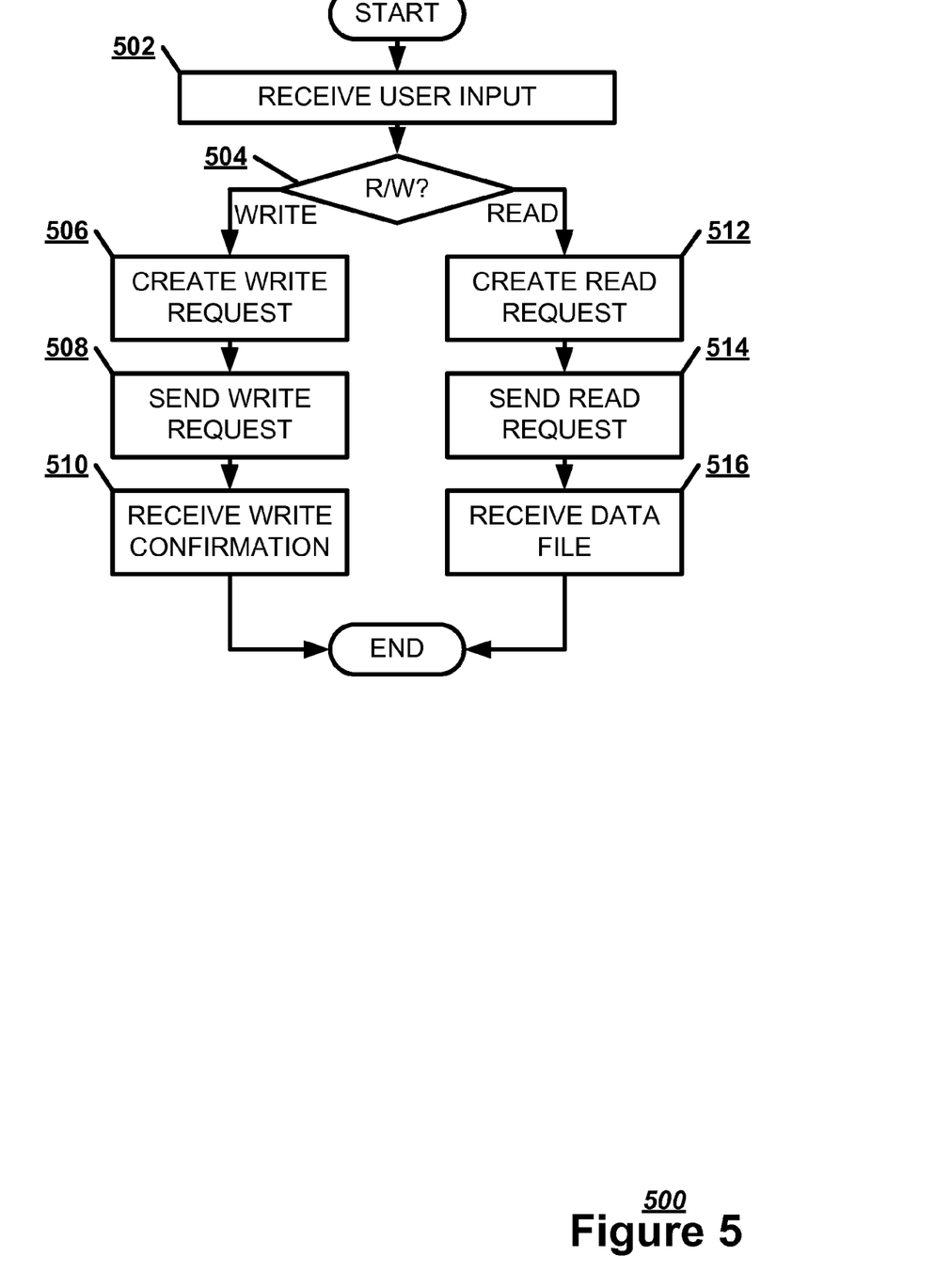
FIG. 5 illustrates, in a flowchart, one embodiment of a method for sending an access request from a client device to a file management system.

FIG. 5 illustrates, in a flowchart, one embodiment of a method 500 for sending an access request from a client device 110 to a network file management system 120. The network file management client 112 on the client device 110 may receive a user input indicating an access request for a data file 122 stored in the network file management system 120 (Block 502). If the user input indicates a write operation request (Block 504), the network file management client 112 may create a write operation request for transmission to the network file management system 120 (Block 506). The network file management client 112 may send the write operation request to the network file management system 120 (Block 508). The network file management client 112 may receive a write confirmation from the network file management system 120 indicating that the write operation was successful (Block 510). If the user input indicates a read operation request (Block 504), the network file management client 112 may create a read operation request for transmission to the network file management system 120 (Block 512). The network file management client 112 may send the read operation request to the network file management system 120 (Block 514). The network file management client 112 may receive a copy of the data file 122 from the network file management system 120 (Block 516).

Figure 6:
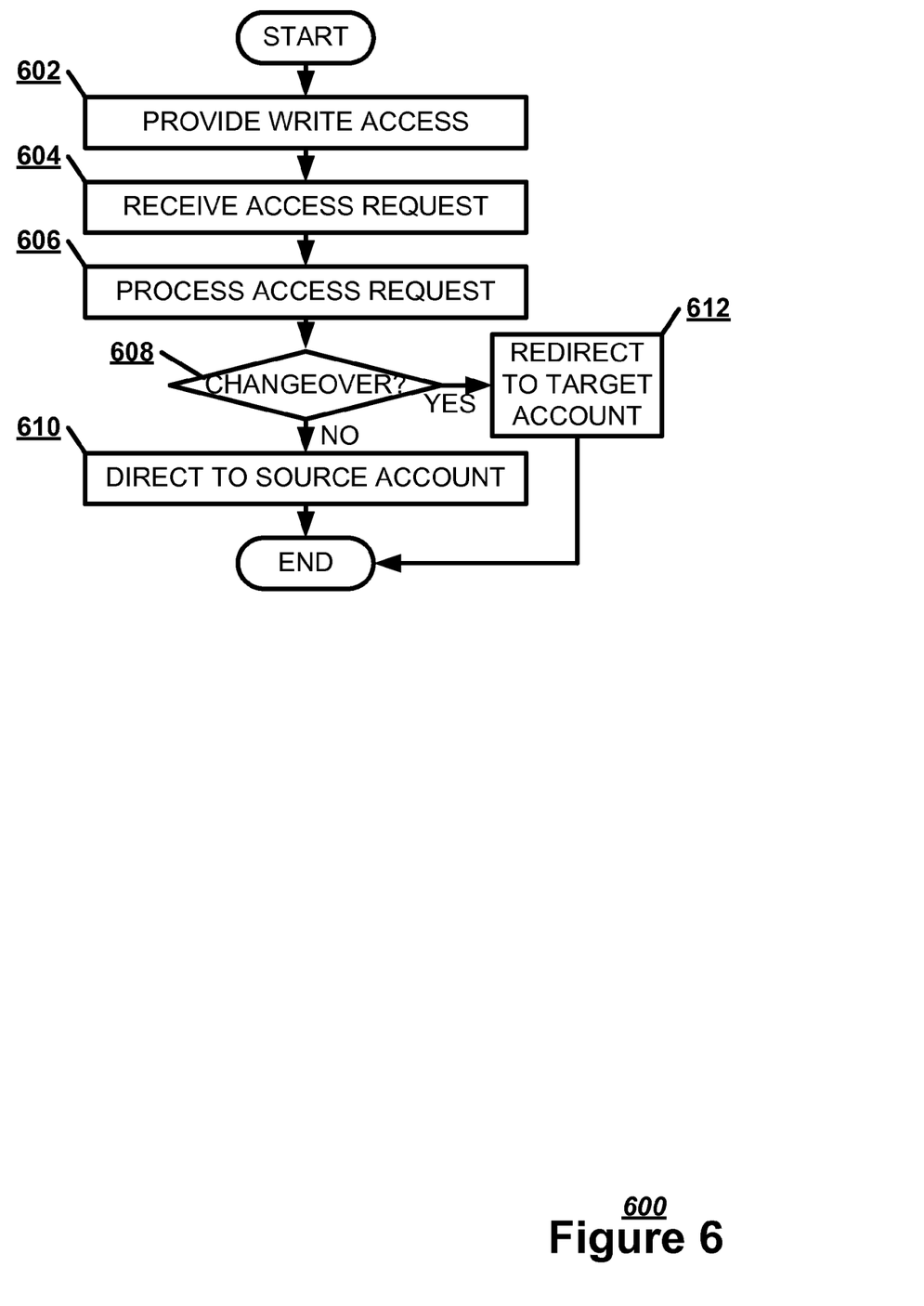
FIG. 6 illustrates, in a flowchart, one embodiment of a method for handling an access request at a load balancer of a file management system during a system upgrade.

FIG. 6 illustrates, in a flowchart, one embodiment of a method 600 for handling an access request at a load balancer 370 of a network file management system 120 during a system upgrade. The load balancer 370 may provide direct write access for a data file 122 on the network file management system 120 to a user throughout a system upgrade (Block 602). Direct write access allows a user to change a data file directly, rather than changing a copy of the data file with the changes later migrated to the original data file. The load balancer 370 may receive an access request from the user for a user proxy account (Block 604). The load balancer 370 may process the access request to the data file 122 on a content database 310 during the system upgrade (Block 606). If the access request is received prior to the changeover point (Block 608), the load balancer 370 may direct an access request from the user to a source user proxy account 352 (Block 610). If the access request is received after the changeover point (Block 608), the load balancer 370 may redirect an access request from the user to a target user proxy account 362 (Block 612).

Figure 7:
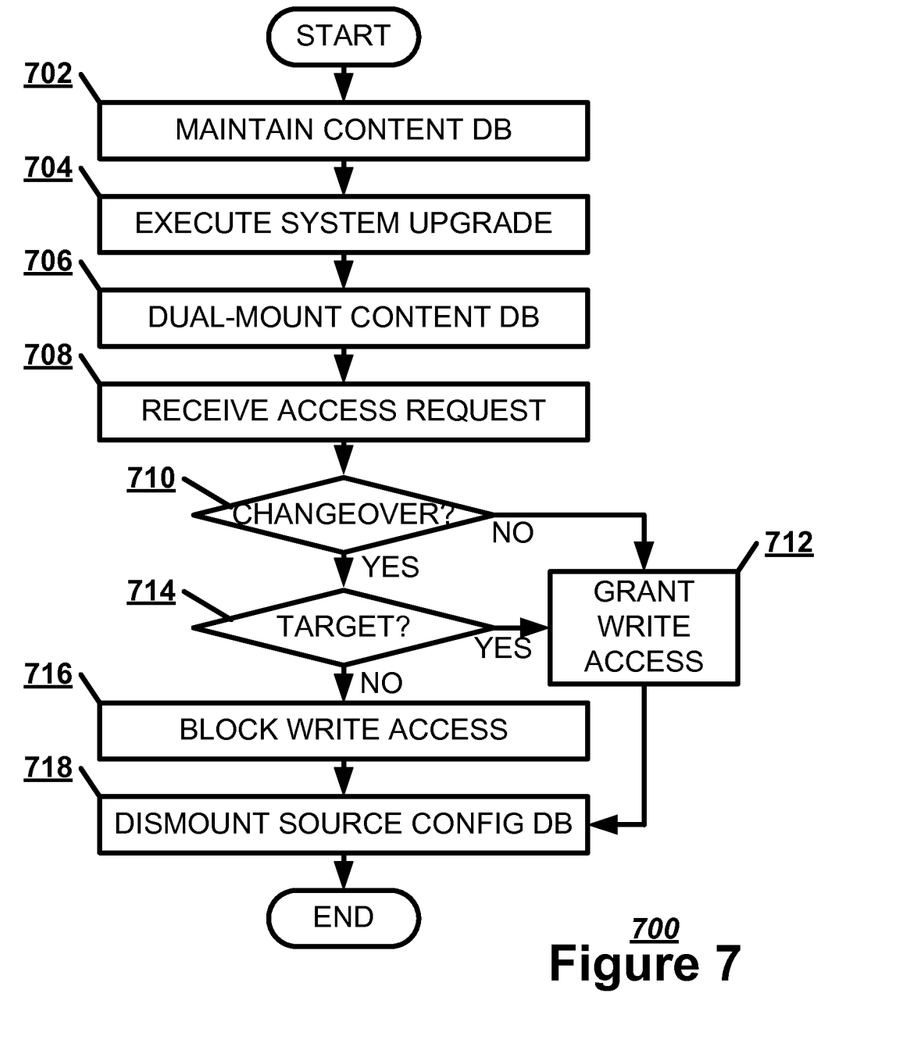
FIG. 7 illustrates, in a flowchart, one embodiment of a method for handling an access request at a grid manager of a file management system during a system upgrade.

FIG. 7 illustrates, in a flowchart, one embodiment of a method 700 for handling an access request at a grid manager 340 of a network file management system 120 during a system upgrade. The grid manager 340 may maintain a content database 310 for the network file management system 120 separate from a source server farm configuration database 320 that stores configuration data for the network file management system 120 (Block 702). The grid manager 340 may execute a system upgrade from the source server farm configuration database 320 to a target server farm configuration database 330 that stores target configuration data for the network file management system 120 (Block 704). The grid manager 340 may dual-mount a content database 310 for the network file management system 120 to the source server farm configuration database 320 and the target server farm configuration database 330 during the system upgrade (Block 706). The grid manager 340 may receive an access request from a server farm 420 (Block 708). If the access request is received prior to a changeover point (Block 710), the grid manager 340 may grant write access to a management proxy account (Block 712). If the access request is received after the changeover point (Block 710) and the access request is directed to a target management proxy account 364 (Block 714), the grid manager 340 may grant write access to a target management proxy account 364 (Block 712). If the access request is received after the changeover point (Block 710) and the access request is directed to a source management proxy account 354 (Block 714), the grid manager 340 may block write access to a source management proxy account 354 (Block 716). The grid manager 340 may dismount the source server farm configuration database 320 from the content database 310 (Block 718).

Figure 8:
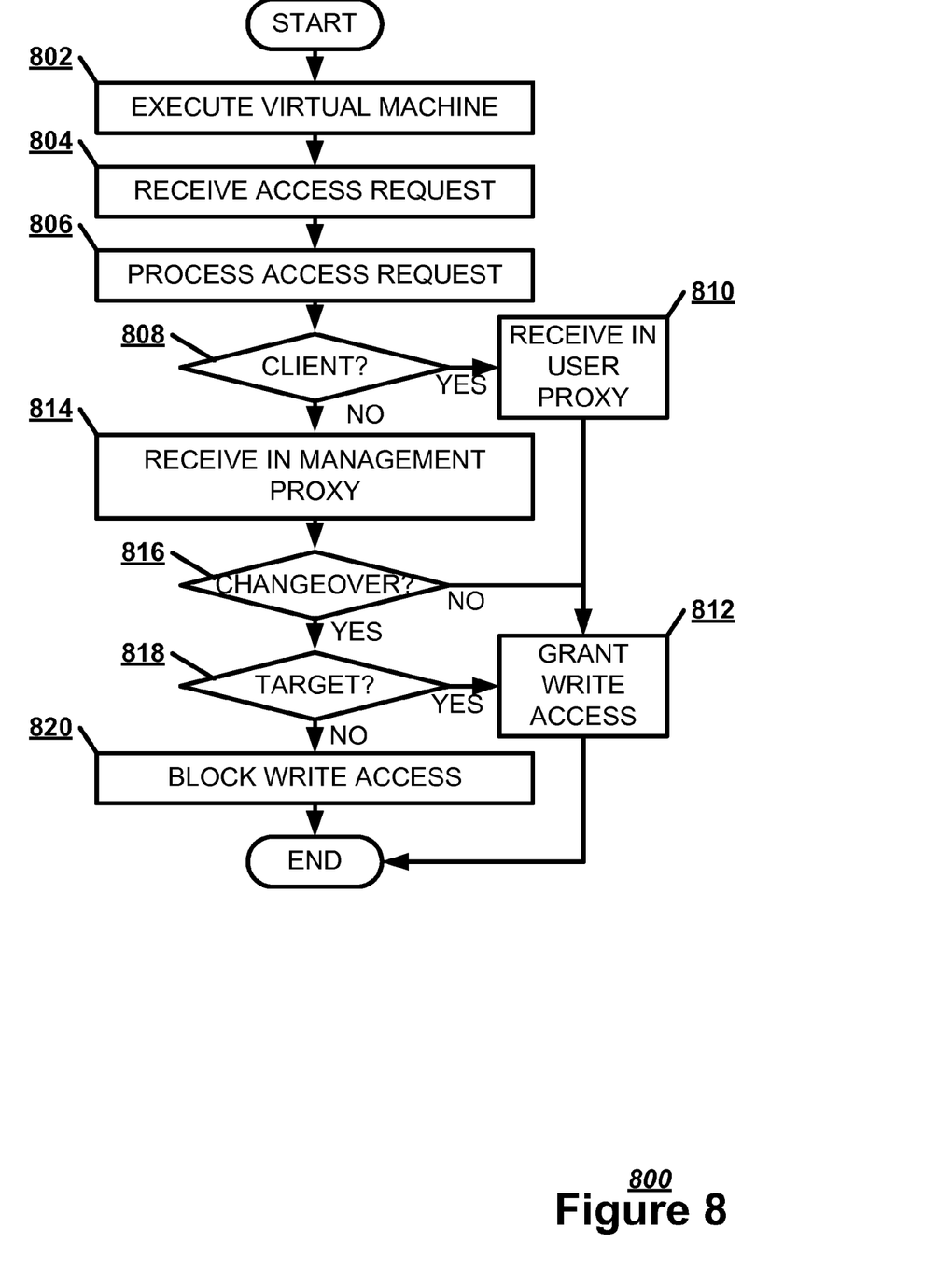
FIG. 8 illustrates, in a flowchart, one embodiment of a method for handling an access request at a virtual machine of a file management system during a system upgrade.

FIG. 8 illustrates, in a flowchart, one embodiment of a method 800 for handling an access request at a virtual machine of a file management system 120 during a system upgrade. A processor 220 may execute a virtual machine (Block 802). The virtual machine may receive an access request (Block 804). The virtual machine may process the access request to a data file 122 on the content database 310 during the system upgrade (Block 806). If the access request is from the client device 110 (Block 808), the virtual machine may receive an access request from the user in a user proxy account (Block 810). The virtual machine may grant write access to the data file 122 to the user proxy account (Block 812). If the access request is from a server farm 420 (Block 808), the virtual machine may receive an access request from the network file management system 120 in a management proxy account (Block 814). If the access request is received prior to a changeover point (Block 816), the virtual machine may grant write access to a management proxy account (Block 812). If the access request is received after the changeover point (Block 816) and the access request is directed to a target management proxy account 364 (Block 818), the target virtual machine 360 may grant write access to a target management proxy account 364 (Block 812). If the access request is received after the changeover point (Block 816) and the access request is directed to a source management proxy account 354 (Block 818), the source virtual machine 350 may block write access to a source management proxy account 354 (Block 820).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
    maintaining a content database for a network file management system, the content database being separate from a source server farm configuration database that stores source configuration data for controlling access to a data file on the content database;
    executing a system upgrade on the network file management system by performing an operation to switch from use of the source configuration data to target configuration data stored in a target server farm configuration database; and
    during at least a portion of the execution of the system upgrade, processing an access request that requests access to the data file on the content database.

2. The method of claim 1, wherein the access request is received from a client device over a network, the client device being remote from the network file management system, and wherein the target configuration data is obtained by applying at least one of an update or a patch to the source configuration data to obtain an upgraded version of the source configuration data.

3. The method of claim 1, wherein the operation comprises a dual-mounting operation in which the content database is mounted to both the source server farm configuration database and the target server farm configuration database, the method further comprising:
    based on a determination that the system upgrade has completed, dismounting the source server farm configuration database from the content database.

4. The method of claim 1, further comprising:
    directing an access request from a user prior to a changeover point to a source user proxy account.

5. The method of claim 1, further comprising:
redirecting an access request from a user after a changeover point to a target user proxy account.

6. The method of claim 1, further comprising:
block write access to a source management proxy account after a changeover point.

7. The method of claim 1, further comprising:
grant write access to a target management proxy account after a changeover point.

8. A computing system comprising:
at least one processor; and
memory storing instructions executable by the at least one processor, wherein the instructions configure the computing system to:
control access to a data file on a network file management system using first configuration data:
execute a system upgrade to upgrade the configuration data used by the network file management system to control access to the data file from the first configuration data to second configuration data; and
during at least a portion of the execution of the system upgrade, provide direct write access for the data file on the network file management system to a use.

9. The computing system of claim 8, wherein the instructions configure the computing system:
store the data file on a content database that is separate from a server farm configuration database that stores the configuration data used by the network file management system to control access to the data tile.

10. The computing system of claim 8, wherein the instructions configure the computing system to:
dual-mount a content database for the network file management system to both a source server farm configuration database and a target server farm configuration database during the portion of execution of the system upgrade.

11. The computing system of claim 10, wherein the instructions configure the computing system to:
dismount the source server farm configuration database from the content database.

12. The computing system of claim 8, wherein the instructions configure the computing system to:
receive an access request from the user in a user proxy account.

13. The computing system of claim 8, wherein the instructions configure the computing system to:
direct an access request from the user prior to a changeover point to a source user proxy account.

14. The computing system of claim 8, wherein the instructions configure the computing system to:
redirect an access request from the user after a changeover point to a target user proxy account.

15. The computing system of claim 8, wherein the instructions configure the computing system to:
receive an access request from the network file management system in a management proxy account.

16. The computing system of claim 8, wherein the instructions configure the computing system to: block write access to a source management proxy account after a changeover point.

17. The computing system of claim 8, wherein the instructions configure the computing system to:
grant write access to a target management proxy account after a changeover point.

18. A network file management system, comprising:
a content database interface that interacts with a content database that stores a multi-share data file; a source server farm configuration database interface that interacts with a source server farm configuration database that stores source configuration data separate from the content database;
a target server farm configuration database interface that interacts with a target server farm configuration database that stores target configuration data separate from the content database;
a processor that executes a virtual machine to process an access request to the multi-share data file on the content database during a system upgrade from the source server farm configuration database to the target server farm configuration database; and
a grid manager that blocks write access to a source management proxy account after a changeover point.

19. The network file management system of claim 18, further comprising:
a load balancer that redirects an access request from the user after a changeover point to a target user proxy account.

* * * * *